(12) United States Patent
Tsai

(10) Patent No.: US 7,017,716 B1
(45) Date of Patent: Mar. 28, 2006

(54) HANDBRAKE OPERATING DEVICE STRUCTURE

(75) Inventor: Szu-Fang Tsai, Chang-Hua Hsien (TW)

(73) Assignee: Tektro Technology Corporation, Chang-Hua Hsien (TW)

(*) Notice: Subject to any disclaimer, the term of this patent is extended or adjusted under 35 U.S.C. 154(b) by 0 days.

(21) Appl. No.: 11/047,634

(22) Filed: Feb. 2, 2005

(51) Int. Cl.
*B62L 3/00* (2006.01)

(52) U.S. Cl. ................ 188/24.22; 188/24.15; 74/489

(58) Field of Classification Search ......... 188/24.11, 188/24.15, 24.21, 24.22; 74/502.2, 489, 74/506, 502.4, 502.5; D12/179
See application file for complete search history.

(56) References Cited

U.S. PATENT DOCUMENTS 4,425,819 A * 1/1984 Shimano ................. 74/489
4,484,490 A * 11/1984 Shimano ................. 74/489
4,553,641 A * 11/1985 Scott et al. ........... 188/24.22
4,735,106 A * 4/1988 Yoshigai ................. 74/489
4,909,094 A * 3/1990 Yoshigai ................. 74/489
6,148,963 A * 11/2000 Canfield, Jr. ......... 188/24.21

* cited by examiner

*Primary Examiner*—Devon C. Kramer
(74) *Attorney, Agent, or Firm*—Leong C. Lei

(57) ABSTRACT

A handbrake operating device is provided. The handbrake operating device contains a positioning seat and an operating lever. The positioning seat has a tubular portion on one end for fitting a curved handlebar. The positioning seat has a connection slot on the other end allowing the brake wire to pass through. The handbrake operating device is designed such that the brake wire goes nearly straight between the handbrake operating device and the brake device of the vehicle. As the brake wire is not bended with any abrupt angle and remains in a tensed condition, the brake device of the vehicle would quickly and sensitively respond to the handbrake operating device.

1 Claim, 5 Drawing Sheets

HANDBRAKE OPERATING DEVICE STRUCTURE

BACKGROUND OF THE INVENTION (a) Technical Field of the Invention

The present invention generally relates to handbrakes, and more specifically to the structure of a handbrake operating device for improving handbrake sensitivity.

(b) Description of the Prior Art

Conventionally, bicycles, motorcycles, kick scooters, and electric scooters all require a handbrake operating device mounted on the handlebar for stopping the vehicles. The design of the handbrake operating device is therefore a key to the rider's safety.

FIG. 2 is a plan view of a conventional handbrake operating device. As illustrated, the handbrake operating device contains an operating lever and a positioning seat for attaching the handbrake operating device to the handlebar. The positioning seat has a tubular portion so that the handlebar could be fitted inside. The tubular portion is fixed and locked to the handlebar by a pin-jointed member. On the other side of the positioning seat, there is a joining portion opposite to the tubular portion. The joining portion has a through hole whose axial direction is paralleled with the handlebar. The through hole is bolted by a nut having a slot opening. The brake wire is then slid through the slot opening and the through hole, and has its wire head locked in an anchoring hole of the operating lever.

As shown in FIG. 2, the through hole through which the brake wire is slid is designed to be parallel to the handlebar and perpendicular to the positioning seat. In this way, when the operating lever is squeezed inward towards the handlebar, the brake wire is pulled, which in turn leads to the brake devices at the two sides of the wheel to stop the wheel.

Please refer to FIG. 1 again. The handlebar as illustrated has a U shape. When the aforementioned handbrake operating devices are installed on the U-shaped handlebar, the brake wires first go from the joining portion of the positioning seat, horizontally through the slot opening and the through hole, then along the two slant arms of the U-shaped handlebar in an almost vertical angle, and finally down to the bicycle frame to connect with the brake devices.

The brake wire changes its direction from a horizontal one (i.e., parallel to the handlebar) at the joining portion of the positioning seat to a vertical direction (i.e., perpendicular to the handlebar) as it goes down to connect the brake device. Such an abrupt angle would degrade the brake device's responsiveness, which increases the risk of the bicycle rider.

To overcome such a shortcoming, conventionally, the handbrake operating device is moved forward or backward a bit along the handlebar, so as to avoid the vertical section of the handlebar. In this way, the brake wire would undergo a smoother directional change and the handbrake sensitivity is thereby enhanced.

However, adjusting the handbrake operating device's position makes the rider's operation of the handbrake more difficult, as the rider has to reach out for the handbrake operating device. Obviously, there is still plenty of room left for better solutions.

SUMMARY OF THE INVENTION

The primary purpose of the present invention is to provide a handbrake operating device structure for use on a curved handlebar. Unlike conventional handbrake operating devices on such curved handlebars, the present invention does not require the brake wires to undergo abrupt directional change, which is the major cause of the handbrake's retardant performance. The present invention has a connection slot for the installation of a brake wire configured on the positioning seat of the handbrake operating device. The connection slot has its end opening perpendicular to the horizontal section of the curved handlebar, so that the brake wire could go parallel to the vertical section of the curved handlebar and nearly straight to the brake device. The brake wire is thereby always in a straight and tensed condition between the handbrake operating device and the brake device. The handbrake sensitivity is therefore enhanced.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In the following, detailed description along with the accompanied drawings is given to better explain preferred embodiments of the present invention. Please note that some parts of the accompanied drawings are not drawn to scale or are somewhat exaggerated. It should be understood that this is for illustrative purpose and is not intended to limit the presentation in any way.

Figure 1:
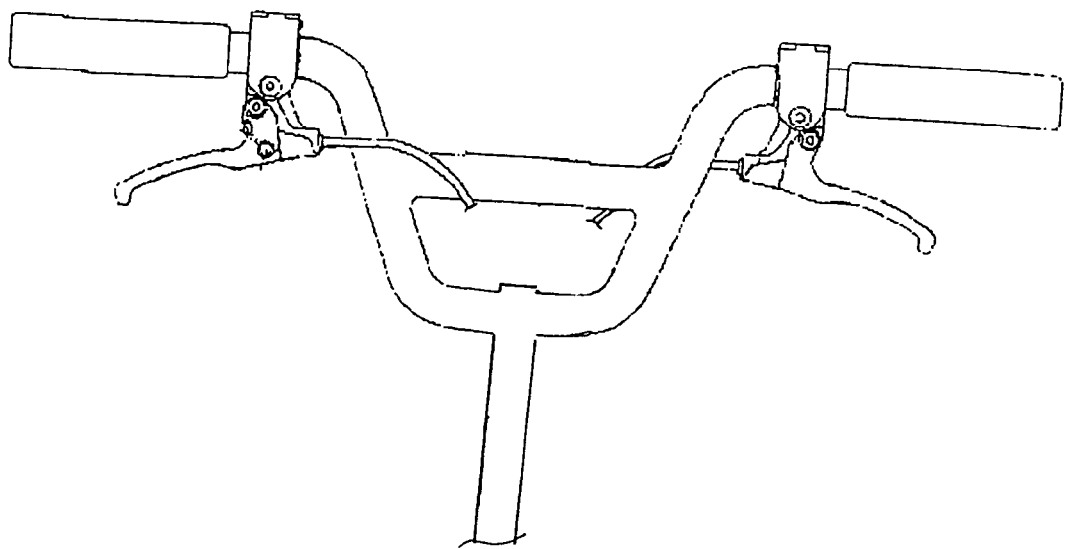
FIG. 1 is a perspective view of conventional handbrake operating devices installed on a curved handlebar.
Figure 2:
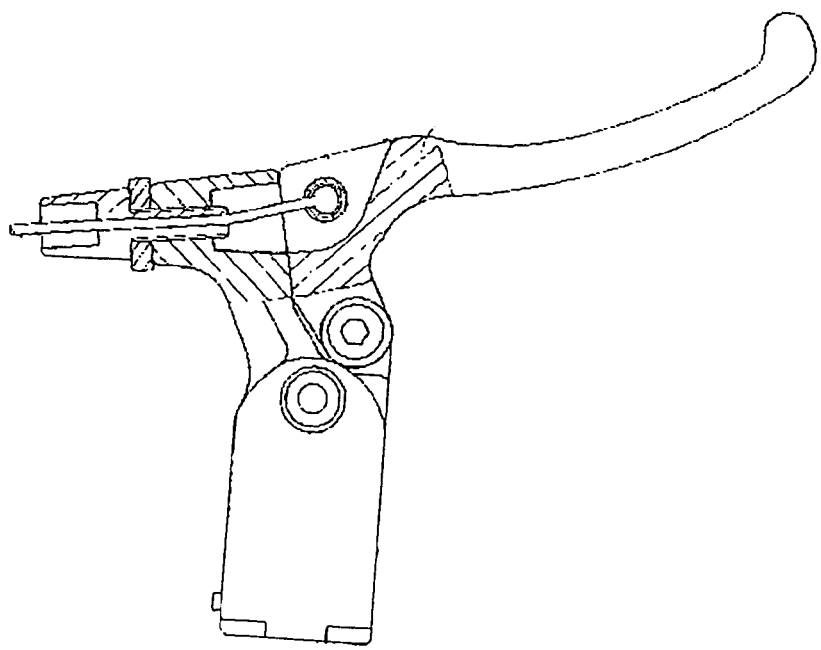
FIG. 2 is a plain view of a conventional handbrake operating device.
Figure 3:
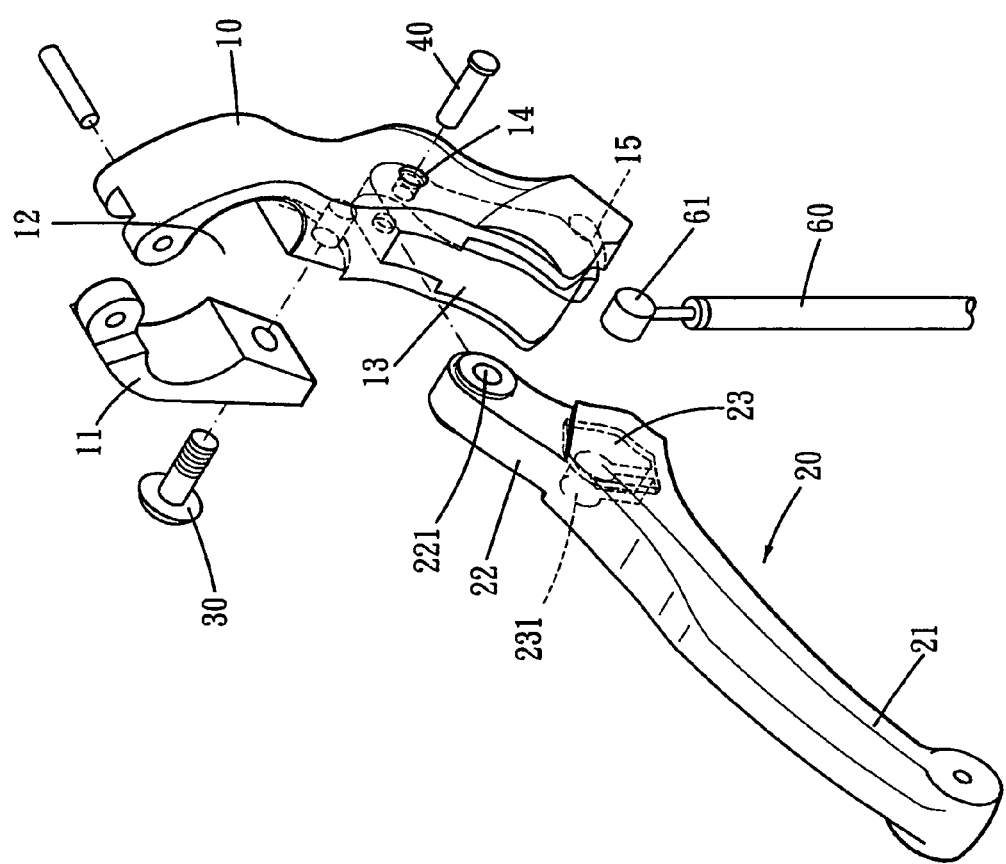
FIG. 3 is an explosion view of a handbrake operating device according to the present invention.
Figure 4:
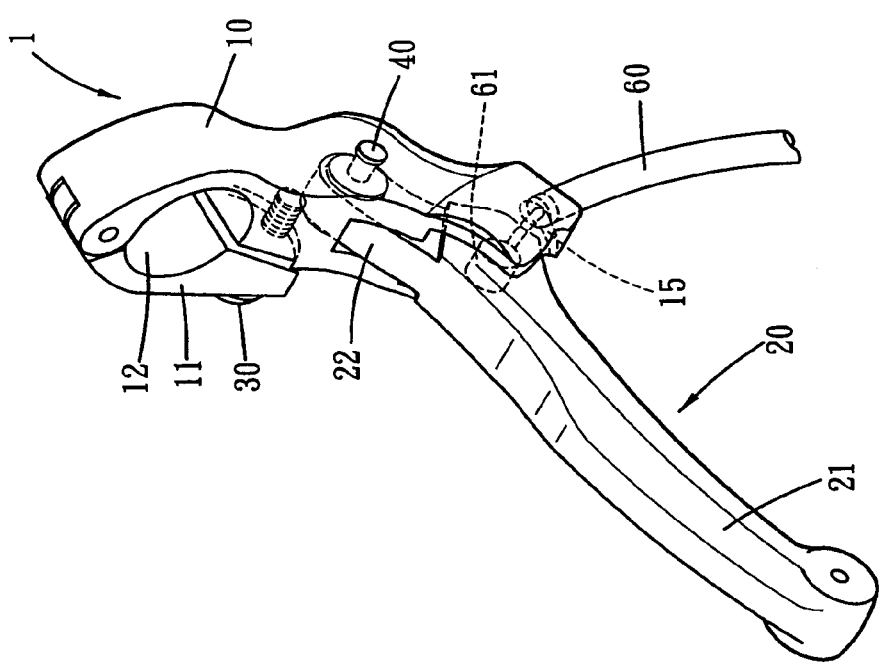
FIG. 4 is a perspective view of an assembled handbrake operating device according to the present invention.

Please refer to FIGS. 3 and 4. The handbrake operating device 1 mainly contains a positioning seat 10 and an operating lever 20.

The positioning seat 10 has a semi-circular member (not numbered) at one end that would form a tubular portion (not numbered) with another semi-circular adjusting member 11, when they are bolted together by a bolt member 30. By fitting the handlebar 50 inside the semi-circular member and fixedly locking the handlebar 50 with the adjusting member 11 and bolt member 30, the positioning seat 10 is perpendicularly attached to the handlebar 50 (please also see FIG. 6).

At the other end of the positioning seat 10 opposite to the semi-circular member, a trough member 13 having a predetermined shape which allows an end of the operating lever 20 having an pivoting hole 221 to fit inside. In the middle of the positioning seat 10, there is a pin hole 14 that goes from one side of positioning seat 10 to the other side and through the trough member 13. The end 22 of the operating lever 20 is pin-joined to the positioning seat 10 by installing a locking pin 40 through the pin hole 14 of the positioning seat 10 and the pivoting hole 221 of the operating lever 20. The operating lever 20 is thereby free to pivot around the pivoting hole 221.

The positioning seat 10 further has a connection slot 15 at the end where the trough member 13 is located. The connection slot 15 offers a slot opening to an end of the trough member 13 which a brake wire 60 could be slid through. Please refer to FIG. 6 and note that the trough member 13 and the connection slot 15 are configured in a way that the connection slot 15 is nearly perpendicular to the horizontal section of the handlebar 50. As such, the brake wire 60 slid through the connection slot 15 is also nearly perpendicular to the horizontal section of the handlebar 50.

The operating lever 20 has a handle section 21 allowing a rider to grip, which extends from the middle of the operating lever 20 to one end. On the other end, the operating lever 20 has a joining section 22 having a predetermined shape that can be fitted inside the trough member 13 of the positioning seat 10. The joining section 22 has an pivoting hole 221 so that, when the joining section 22 is fitted in the trough member 13, the operating lever 20 is pin-joined to the positioning seat 10 by a locking pin 50 installed through the pin hole 14 and the pivoting hole 221. At the intersection of the joining section 22 and the handle section 21, the operating lever 20 has an anchoring trough 23 having a predetermined shape. The anchoring trough 23 allows a brake wire 60 to be fitted inside from the anchoring trough 23's opening to a side of the operating lever 20. The anchoring trough 23 has an anchoring hole 231 for fitting the wire head.

Figure 5:
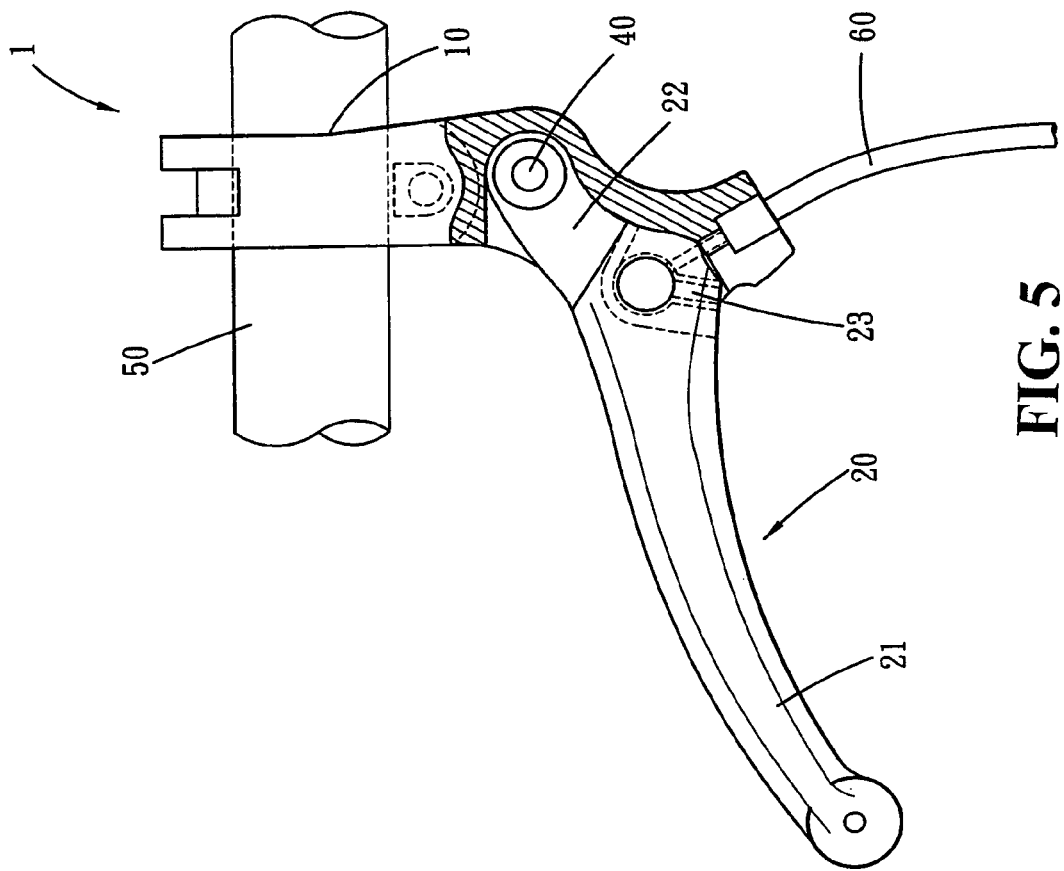
FIG. 5 is a plain view of a handbrake operating device according to the present invention.

When the operating lever 20 and the positioning seat 10 is pin-joined together, as shown in FIGS. 4 and 5, the operating lever 20's anchoring trough 23 and the positioning seat 10's connection slot 15 would form a path allowing the brake wire 60 to slide from the connection slot 15 into the anchoring trough 23 and the round wire head 61 of the brake wire 60 could be fitted inside the anchoring hole 231. As shown in FIGS. 4 and 5, since the connection slot 15 is configured such that, when the brake wire 60 is installed and when the positioning seat 10 is fixedly locked to the handlebar 50, the brake wire 60 would be nearly perpendicular to the handlebar 50.

Figure 6:
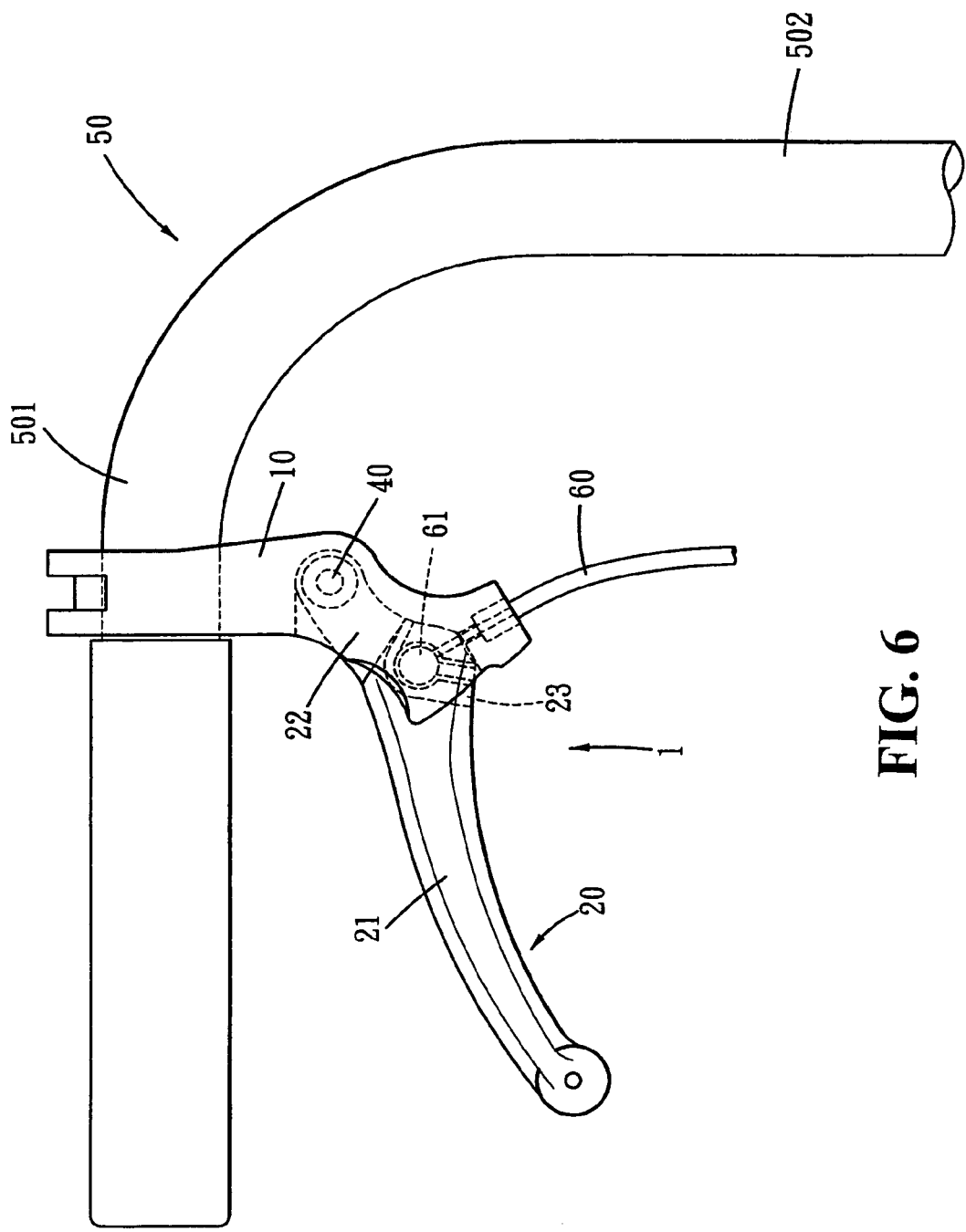
FIG. 6 is a plain view of a handbrake operating device according to the present invention installed on a curved handlebar under a non-operative condition.
Figure 7:
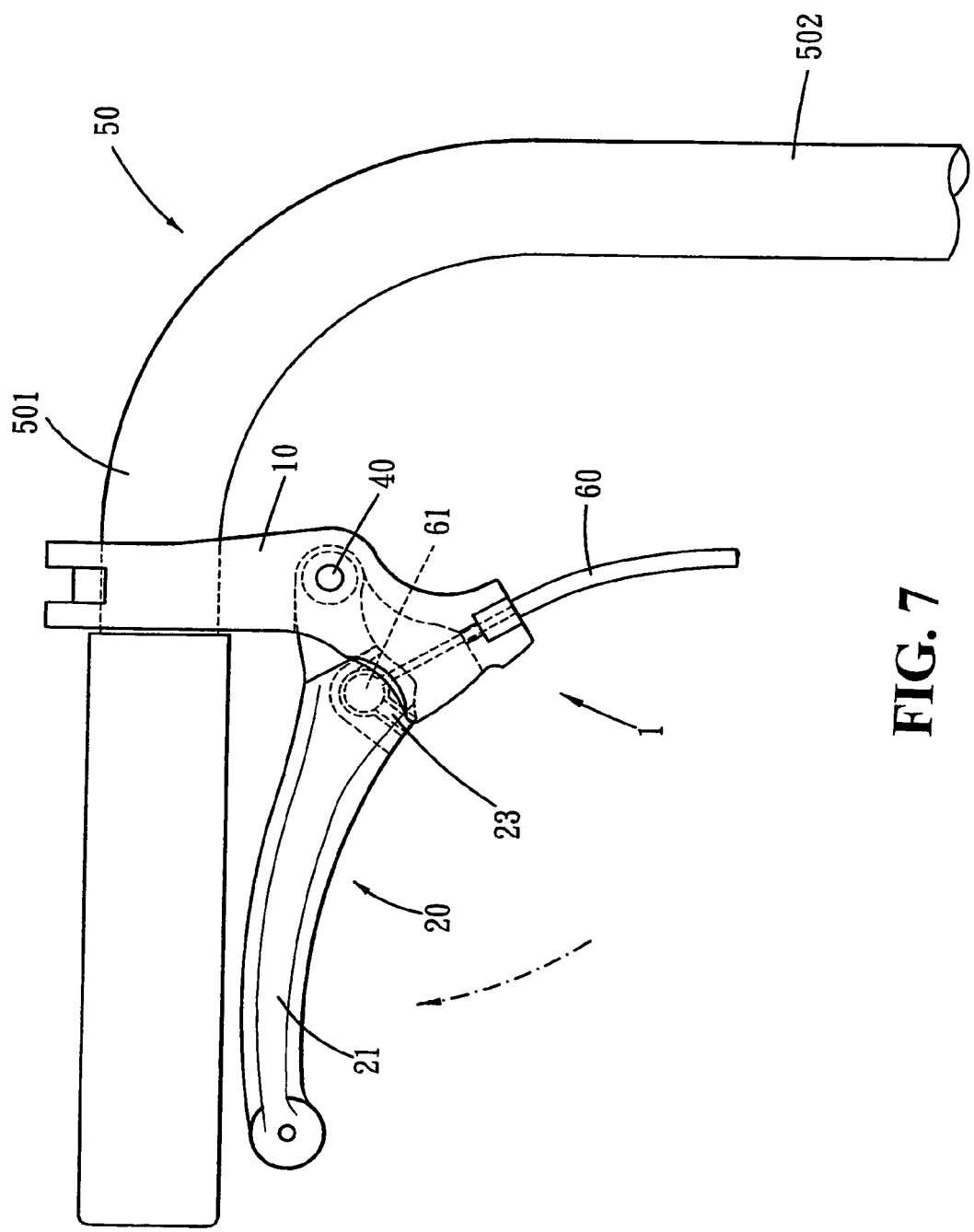
FIG. 7 is a plain view of a handbrake operating device according to the present invention installed on a curved handlebar under an operated condition.

Please refer to FIGS. 6 and 7, which show the handbrake operating device 1 according to the present invention installed on a curved handlebar 50. Generally curved handlebars are often found on children's bicycles, trolleys, wheeled chairs. For simplicity, the handlebars here refer to all curved handlebars used on these and similar vehicles. The handbrake operating device 1 is installed on the handlebar 50 by fitting the tubular portion 12 over the handlebar 50, and the positioning seat 10 and horizontal section 501 of the handlebar 50 are perpendicular to each other.

As can be seen clearly in FIG. 6, the brake wire 60 has its wire head 61 locked in the anchoring hole 231 of the handbrake operating device 1, and goes nearly parallel to the vertical section 502 of the curved handlebar 50. On the other hand, the brake wire 60 is nearly perpendicular to the horizontal section 501 of the curved handlebar 50. As such, the brake ware 60 is not bended with any sharp angle and the handbrake of the vehicle has the best sensitivity.

Therefore, when a rider would like to stop the vehicle, the rider directly grips the operating lever 20. The operating lever 20 pivots around the pin hole 231 of the joining section 22 towards the handlebar 50. The anchoring hole 231 of the operating lever 20 drags the wire head 61, which in turn pulls the brake ware 60 and, thereby, closes the brake devices to clip the wheel (both the brake devices and the wheel are not shown). The vehicle is therefore stopped with great sensitivity.

The most significant feature of the present invention lies in that the connection slot 15 of the positioning seat 10, though which the brake wire 60 goes, is configured such that it is nearly perpendicular to the horizontal section 501 of the handlebar 50, and nearly parallel to the vertical section 502 of the handlebar 50. Therefore, when the handbrake operating device 1 of the present invention is applied on the vehicle with a curved handlebar 50, the brake wire 60 connecting the handbrake operating device 1 and the brake device stays in a tensed condition with no abrupt bending. The brake devices would therefore quickly and sensitively respond to the operation of the handbrake operating device 1.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A handbrake operating device comprising a positioning seat and an operating lever, said positioning seat having a tubular portion on one end and a trough member on an other end for pin-joining said operating lever and allowing said operating lever to pivot, a connection slot of said trough member and an anchoring trough of said operating lever forming a path to allow a brake wire to pass through and to connect to an anchoring hole of said operating lever, wherein said brake wire goes nearly parallel to a vertical section of a curved handlebar and goes nearly perpendicular to a horizontal section of said curved handlebar, and said brake wire goes nearly straight with no significant bending, said positioning seat has its connection slot nearly parallel to said vertical section of said curved handlebar when said handbrake operating device is installed on said curved handlebar, said tubular portion is formed by pin-joining a semi-circular member of said positioning seat and a separate semi-circular adjusting member, and said operating lever has a joining section for fitting inside said trough member of said positioning seat, and said joining section has a pivoting hole allowing a locking pin to be inserted, said locking pin pin-joins said pivoting hole and a pin hole in at a middle of said positioning seat.

* * * * *